US012767490B2

(12) United States Patent
Garrison et al.

(10) Patent No.: US 12,767,490 B2
(45) Date of Patent: Oct. 20, 2026

(54) GRAPPLE BUCKET WITH DEBRIS BAG HANGER AND AUTONOMOUS STRAP RELEASE

(71) Applicants: Tyler A. Garrison, Lakeland, FL (US); Nicolas W. Garcia, Winter Haven, FL (US)

(72) Inventors: Tyler A. Garrison, Lakeland, FL (US); Nicolas W. Garcia, Winter Haven, FL (US)

(73) Assignee: Petersen Industries, Inc., Lake Wales, FL (US)

( * ) Notice: Subject to any disclaimer, the term of this patent is extended or adjusted under 35 U.S.C. 154(b) by 594 days.

(21) Appl. No.: 18/243,452

(22) Filed: Sep. 7, 2023

(65) Prior Publication Data

US 2025/0066165 A1 Feb. 27, 2025

Related U.S. Application Data

(60) Provisional application No. 63/534,258, filed on Aug. 23, 2023.

(51) Int. Cl.

| | |
|---|---|
| ***B66C 3/00*** | (2006.01) |
| ***B66C 1/10*** | (2006.01) |
| ***B66C 3/04*** | (2006.01) |

(52) U.S. Cl.

CPC ................ *B66C 3/04* (2013.01); *B66C 1/101* (2013.01); *B66C 2700/0357* (2013.01)

(58) Field of Classification Search

CPC ... B66C 3/04; B66C 1/101; B66C 2700/0357; B66C 1/585; B66C 21/00; B66C 1/125;

(Continued)

(56) References Cited

U.S. PATENT DOCUMENTS 1,246,468 A * 11/1917 Robinson et al. ....... B63B 23/58 294/82.27
2,072,735 A * 3/1937 Dudouit .................. B63B 23/58 114/379

(Continued)

*Primary Examiner* — Jacob A Smith

(74) *Attorney, Agent, or Firm* — The Concept Law Group, P.A.

(57) ABSTRACT

A boom truck having a grapple bucket with first and second jaws which controllably pivot on an axle from an open to partly closed jaw positions. The bucket picks up a debris-carrying bag via lifting straps. The bucket has an elongated hanger, one end mounted on the first jaw and an opposing strap carrying, terminal end which transverses the axle in open jaw position. Bucket a wiper mounted on bucket's second jaw with a wiper surface adjacent hanger's strap carrying region in open position. Hanger's terminal end region is foreshortened such that the end arcuately bypasses wiper's surface during pivotal movement of both jaws during transition from open to partly closed jaw positions. method of lifting, carrying and depositing a debris-carrying bag having at least one lifting strap. Method includes placing lifting strap on strap carrying region and lifting the bag in the open jaw position. With grapple in final deposition position, jaws pivot from open position to partly closed jaw position and strap is pushed off the strap carrying region by a wiper mounted on the second jaw. Creating gap between strap carrying region and wiper off-loads strap via gap in the closed, bag deposition position.

4 Claims, 9 Drawing Sheets

(58) Field of Classification Search
CPC ........... B66C 1/427; B66C 1/68; B66C 11/10; B66C 21/04; B66C 23/36; B66C 23/44
USPC ...... 294/86.4, 82.27, 112; 212/84, 197, 300, 212/313, 317, 89
See application file for complete search history.

(56) References Cited

U.S. PATENT DOCUMENTS

| | | | | |
|---|---|---|---|---|
| 3,426,915 | A * | 2/1969 | Tesch | B66C 23/36 212/300 |
| 3,695,672 | A * | 10/1972 | Mitchell | B66C 1/585 212/84 |
| 3,802,731 | A | 4/1974 | La Bounty | |
| 4,017,114 | A | 4/1977 | La Bounty | |
| 4,907,356 | A | 3/1990 | Labounty | |
| 5,150,936 | A | 9/1992 | Avery | |
| 5,653,350 | A * | 8/1997 | Maki | B66C 21/04 212/84 |
| 2020/0071135 | A1 | 3/2020 | Ybarra | |
| 2020/0331736 | A1 * | 10/2020 | Colbran | B66C 3/16 |

* cited by examiner

GRAPPLE BUCKET WITH DEBRIS BAG HANGER AND AUTONOMOUS STRAP RELEASE

This is a non-provisional patent application claiming the benefit of provisional patent application Ser. No. 63/534,258, filed Aug. 23, 2023, the contents of which is incorporated herein by reference thereto.

The present invention relates to a grapple bucket generally attached at the end of a boom mounted on a truck. More particularly, the grapple bucket includes a debris bag hanger and an autonomous strap release element. The invention also includes a method of lifting, carrying and depositing a debris-carrying bag using a truck with a boom terminating in a grapple bucket.

BACKGROUND OF THE INVENTION

The design and operation of grapple trucks which include two opposing "bucket" jaws are well known in the art. Several grapple trucks and grapple buckets are discussed and shown in U.S. Pat. Nos. 3,802,731; 4,017,114; 4,907,356; 5,150,936; 5,653,350; and U.S. Patent Publications Nos. 20200071135 and 2020331736, the contents of which is incorporated herein by reference thereto.

As shown in the prior art, the grapple truck operator rotates the boom and lowers the grapple bucket (consisting of opposing bucket jaws) onto and about debris located alongside grapple truck. Prior to grabbing the debris, the bucket jaws are in a substantially open position. Typically, the operator lowers open-jawed bucket onto the debris and closes the bucket jaws about piled-up debris. Thereafter, the operator uses the boom to raise and lift the closed grapple debris-carrying jaws and sometimes rotates these loaded jaws to a position above an open top of a rear truck bed. Thereafter, the operator opens the jaws and deposits the debris into the open top truck bed.

However, sometimes the debris consists of smaller items that are not well captured by the typical operation of a grapple truck. In this situation, the debris may be gathered up placed in a large debris carrying bag. It would be beneficial to enable grapple trucks and, more particularly, grapple jaws to capture these debris carrying bags and deposit the bagged debris in the open top truck bed. In this manner, the grapple truck could be utilized both to pickup and is commonly done with prior art trucks and, with the present invention, enable a modified grapple truck to pickup bag-carried debris, including lifting the bag and depositing the bag at another desirable location or depositing the debris-carrying bag in the open top truck bed purely by mechanical means.

SUMMARY OF THE INVENTION

The invention provides a grapple bucket with debris bag hanger and autonomous strap release that overcomes the hereinafore-mentioned disadvantages of the heretofore-known devices and methods of this general type.

With the foregoing and other objects in view, there is provided, in accordance with the invention, a truck with a boom terminating in a grapple bucket. The grapple has a first jaw and a second jaw which pivot on a bucket axle. Both jaws are configured to controllably pivot on the axle from a substantially open jaw position to a partly closed jaw position. The grapple bucket is adapted to and does pick up a debris-carrying bag. The debris-carrying bag has one or more, and typically two, opposing lifting straps. The grapple bucket includes an elongated hanger having one end mounted on the first jaw above the bucket axle. The hanger has a strap carrying region at a terminal end opposite the one end mounted on the first bucket jaw. The hanger extends transversely over the axle while the grapple bucket is in the open jaw position. The grapple bucket also includes a wiper mounted to the bucket second jaw. The wiper has a wiper surface adjacent the strap carrying region in the open jaw position. Stated otherwise, in the open jaw position, the strap on the debris carrying bag is placed on the wiper's strap carrying region. The hanger's strap carrying, terminal end region is foreshortened (that is, it has a short strap carrying length) such that the hanger's terminal end arcuately bypasses the wiper surface during a pivotal movement of both bucket jaws when the jaws transition from the open jaw position to the partly closed jaw position.

In accordance with another feature, an embodiment of the present invention deploys the bag's lifting strap on the hanger's strap carrying region and this lifting strap is off-loaded by the wiper which wipes the lifting strap off the hanger's strap carrying region in the partly closed jaw position. A further embodiment of the invention has the strap carrying region at a substantially horizontal position. The wiping surface, in this embodiment, has a horizontal wiper member wherein the wiper surface extends transversely to the hanger's strap carrying region. In another embodiment, a U-shaped wiper is provided with the conjoining U-element defining at least a portion of the wiper surface and, in this embodiment, the hanger's strap carrying region nests into the U-shaped wiper in the open jaw position.

In another embodiment, the first and the second jaws are respectively mounted on first and second saddles. The first and the second saddles controllably pivot on the bucket axle, moving concurrently with the respectively attached first and second jaws. In the open jaw position, the at least one bag lifting strap is threaded above the respective saddle and over the axle and the strap is placed or disposed on the hanger's strap carrying surface.

Another embodiment has two hangers and two wipers, typically at each outboard end of the bucket. The debris carrying bag has two lifting straps, typically at opposing bag positions. These are sometimes called first and second lifting straps. One elongated first hanger is mounted on a first end vertical surface of a first jaw at a first jaw location above the axle. A second elongated hanger is mounted on a second jaw at a second end and at a second jaw location above the axle. The first jaw is at one end of the bucket and the second vertical jaw surface is at the send opposing end of the bucket. The first and second hangers respectively have first and second strap carrying regions at respective first and second terminal ends opposite the respective first and second jaw mounts. Also, the first and second hangers respectively extend transversely over the axle in the open jaw position. First and second wipers are respectively mounted to opposing jaw regions of the first and second jaws such that the first hanger cooperates with the first wiper and the second hanger cooperates with the second wiper. The first and second wipers respectively each define first and second wiper surfaces adjacent respective first and second strap carrying regions in the open jaw position. The lifting straps hang on the hangers' strap carrying regions from the open jaw position and are forced off these regions by the respective first and second wiper surfaces during the pivotal transition from the open jaw position to the partly closed jaw position. Each strap carrying, terminal end region is foreshortened (that is, it has a short strap carrying length) such that the respective hanger's terminal end arcuately bypasses the corresponding wiper surface during a pivotal transitional movement from the open jaw position to the partly closed jaw position.

A different embodiment of the present invention includes a grapple bucket with debris bag hanger. The grapple bucket is controllably movably coupled to a boom. The boom is on a truck. The grapple is adapted to and does lift and move the debris bag using a bag lifting strap. The grapple bucket includes a first grapple jaw and a second grapple jaw pivotally mounted on a bucket axle. Both jaws are configured to controllably pivot on the bucket axle from a substantially open jaw position to at least a partly closed jaw position. Preferably, the jaws can be operatively fully open and fully closed in the absence of the bag carrying operation disclosed herein. An elongated hanger has one end mounted on the first jaw above the axle and the hanger has a strap carrying region at a terminal end opposite the one mounting end. The hanger extends transversely over the axle in the open jaw position. The grapple bucket also includes a wiper mounted to the second jaw. The wiper has, in the open jaw position, a wiper surface adjacent the hanger's strap carrying region. The hanger's strap carrying region and its terminal end are foreshortened to arcuately bypass the wiper surface during the pivotal transition from the open jaw position to the partly closed jaw position.

In another further embodiment, the grapple bucket has, in the partly closed jaw position, a gap defined between the hanger's foreshortened, strap carrying, terminal end region and the wiper surface. In this partly closed jaw position, the gap permits off-loading of the lifting strap from the wiper surface. Stated otherwise, at the bag off-load position (which is in the preferred embodiment, the partly closed jaw position), there is a gap between the most terminal end of the hanger and the opposing most terminal surface end of the wiper.

In accordance with another feature, an embodiment of the present invention includes, in the open jaw position, a hanger wherein the strap carrying region is substantially horizontal and a wiper which includes, in one embodiment, a horizontal wiper member, wherein the wiper surface extends transversely to the strap carrying region. In a different embodiment, the hanger's strap carrying region is substantially horizontal and the wiper is configured, in this different embodiment, as a U-shaped wiper with the conjoining U-element defining at least a portion of the wiper surface wherein in the open jaw position the strap carrying region nests into the U-shaped wiper.

Another embodiment of the invention has a bag with two lifting opposing straps. The elongated hanger is a first hanger having a first end mounted on the first jaw at a first jaw location above the axle. The grapple bucket has a second elongated hanger mounted on either the first jaw or the second jaw at a second jaw location above the axle. First and second hangers respectively have first and second strap carrying regions at respective first and second terminal ends opposite the respective first and second jaw-mount ends. These first and second hangers respectively extend transversely over the axle in the open jaw position. First and second wipers are respectively mounted to corresponding opposing jaws of the first and second jaws. The first and second wipers respectively define first and second wiper surfaces adjacent respective first and second strap carrying regions in the open jaw position. In this configuration, the first and second strap carrying regions are foreshortened to respectively arcuately bypass the respective first and second wiper surfaces during a pivotal transition from the open jaw position to the partly closed jaw position.

A different embodiment of the present invention includes a method of lifting, carrying and depositing a debris-carrying bag having at least one lifting strap. The method includes the use of a truck having a boom terminating in the grapple bucket. The grapple defines a first jaw and a second jaw which pivot on a bucket axle. Both jaws are configured to controllably pivot on the axle from a substantially open jaw position to a partly closed jaw position. The method places the strap onto a foreshortened strap carrying region of an elongated hanger. The hanger extends transversely over the axle in the grapple's open jaw position. After placement of the lifting strap on the foreshortened strap carrying region, the debris-carrying bag is lifted with the grapple and the boom while the bucket is in the open jaw position. Stated otherwise, the grapple bucket is raised while in the open jaw position. When the grapple is at the debris deposition position, and while the jaws pivot on the axle from the open jaw position to the partly closed jaw position, the lifting strap is pushed off the hanger's foreshortened strap carrying region with a wiper that is mounted on the second jaw. A gap is created between a terminal end of the foreshortened strap carrying region and the wiper while the jaws pivot to the partly closed jaw position. As a result, the lifting strap is off-loaded from foreshortened strap carrying region by the wiper via the gap and the debris-carrying bag is deposited at the desired location.

Another aspect of the inventive method of lifting, carrying and depositing the debris-carrying bag includes providing the bag with a second strap, placing the second strap onto a second foreshortened strap carrying region of a second elongated hanger, and substantially repeating the pushing, creating the gap and off-loading steps for both straps.

An additional aspect of the inventive method provides that the elongated hanger is mounted on the first jaw and extends over the axle, and the wiper is mounted on the second jaw. The method includes creating the gap by the arcuate movement of the first jaw in one direction and the concurrent arcuate movement of the second jaw in an opposite direction.

The invention, in another embodiments is a grapple bucket with a soft strap manipulating attachment for securing and releasing loads with soft strap lifting loops. The inventive device includes a grapple bucket that is used to collect solid materials. The bucket includes hydraulic actuated cylinder(s), a saddle, and jaws that rotate about pivot pin(s) or bucket axle. The soft strap manipulating device is secured to the jaws of the bucket and includes a strap support hanger and a wiper. When the grapple is in the open position and above a debris-carrying bag, soft strap loops from the debris bag are placed over the hanger. Thereafter, the grapple and debris carrying bag are lifted. The grapple is then placed over a debris discharge position, and, as the grapple bucket is closed, the wiper on one set of grapple jaws pushes the strap from hanger on the opposing set of grapple jaws, releasing the load and the soft straps fall off of the hanger. Oftentimes, the debris carrying bag is lifted off the ground and the grapple is rotated to a discharge position above a partly enclosed, open top truck bed. From this discharge position, the left and right grapple jaws are partly closed and this partial closure swipes the soft bag straps off the hanger via a U-shaped wiper.

The present invention relates generally to debris collection and more specifically relates to the collection of soft sided debris containers that include soft strap lifting loops. The lifting, manipulating and release of large soft-sided containers with soft strap lifting loops is typically accomplished using a purposefully dedicated attachment on a mobile hoist. This novel concept allows the lifting, manipulating and release of large soft-sided containers with soft strap lifting loops to be accomplished using a multi-purpose grapple bucket that has been modified to add a soft strap manipulating device. The benefit of the combination grapple bucket and soft strap manipulating device is an increase in flexibility for the equipment operator to collect both loose solid material and materials contained in soft sided containers with soft strap lifting loops.

The term "soft strap" as used herein distinguishes a debris carrying bag having a hardware hook. An alternative embodiment of the invention would include a hardware hook (for example, an S-shaped hook) being placed on the hanger and pushed off the hanger with a wiper. However, this S-shaped hook may, upon the discharge of the debris carrying bag in the open top of a debris carrying truck, be lost in the debris. Therefore, the soft-strap lifting strap is better suited than the hardware hook.

The general purpose of the present invention, which will be described subsequently in greater detail, is to provide a new method for the collection of soft sided debris containers that include soft strap lifting loops. In the full, open position of the grapple bucket, the hangar is nested on three sides by the U-shaped wiper. The wiper is positioned at the root of the hangar. The hangar is the load carrying portion of the attachment and supports the load of the soft straps and the debris carrying bag. The function of the wiper is to push the soft straps off of the hangar when the grapple bucket is a partly closed, debris discharge position, different from the full, open position. The straps are manually placed on the hanger when the grapple bucket is in a mainly open position. As the grapple bucket closes, the wiper and hangar move away from each other in a linear direction normal to the hinge pin or bucket axle. As the wiper moves along the hangar, it pushes the soft straps off from the hangar until they are no longer supported. The soft straps are now released, and the grapple bucket can be raised away from the load.

Although the invention is illustrated and described herein as embodied in a grapple bucket with debris bag hanger and autonomous strap release, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. The term "mounted" refers to any type of permanent connection, for example, by welding, bolting or other permanent fixation between the structures discussed herein.

In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. The term "inboard" refers to items inside the referenced structure whereas the term "outboard" refers to items outside the referenced structure. Typically, outboard items are exposed to ambient environmental conditions. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the bucket axle. Hence, the term "transverse" is normal or perpendicular to the longitudinal span of the axle. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "autonomous" in reference to the lifting strap release function, means that the lifting strap is pushed off the hanger without manual assistance from the operator of the grapple truck. The invention functions to automatically push the lifting straps off the hanger at the desired partly closed jaw position.

Prior art disclosures of grapple truck and grapple bucket construction and operation establish that opposing grapple jaws partly rotate or pivot on a pivotal axle or pivot pin. In connection with the following discussion of different embodiments of the present invention, reference is sometimes made to the axial centerline (C-L) of pivotal axle. It is commonly known that the grapple jaws arcuately pivot about the axle. It is known in the art that each jaw moves over an arcuate length and oftentimes each jaw moves over the same arcuate length. The present invention is described as operating from a substantially open jaw position to a "partly closed" jaw position. This partly closed jaw position represents a sectional arcuate region of the arcuate length of the jaw.

BRIEF DESCRIPTION OF THE DRAWINGS

In the figures, like reference numerals refer to identical or functionally similar elements. The separate views which, together with the detailed description of various embodiments of the invention, are incorporated in and form part of the specification, serve to further illustrate various embodiments and explain various principles and advantages all in accordance with the present invention.

FIG. 5 diagrammatically illustrates an upper axial view of the hanger and wiper looking down on the pivotal axle and illustrates an inboard side of another jaw unit. This Figure shows the transverse right side of the grapple bucket whereas FIGS. 1-4B show the inboard portions of the transverse left side jaws. The terms "transverse left side" and "transverse right side" are delineated by and taken from the perspective of a viewer at a transverse axle position looking towards the transverse left side and transverse right side of the bucket jaw sets, that is, from a transverse view, the pivotal axle extends to the left and the right of the viewer.

FIGS. 5 and 6B show the hanger substantially nesting in the U-shaped wiper. The term "nesting" is meant to include both an in-contact condition and a closely adjacent condition of the hanger with respect to the wiper.

DETAILED DESCRIPTION

Figure 1:
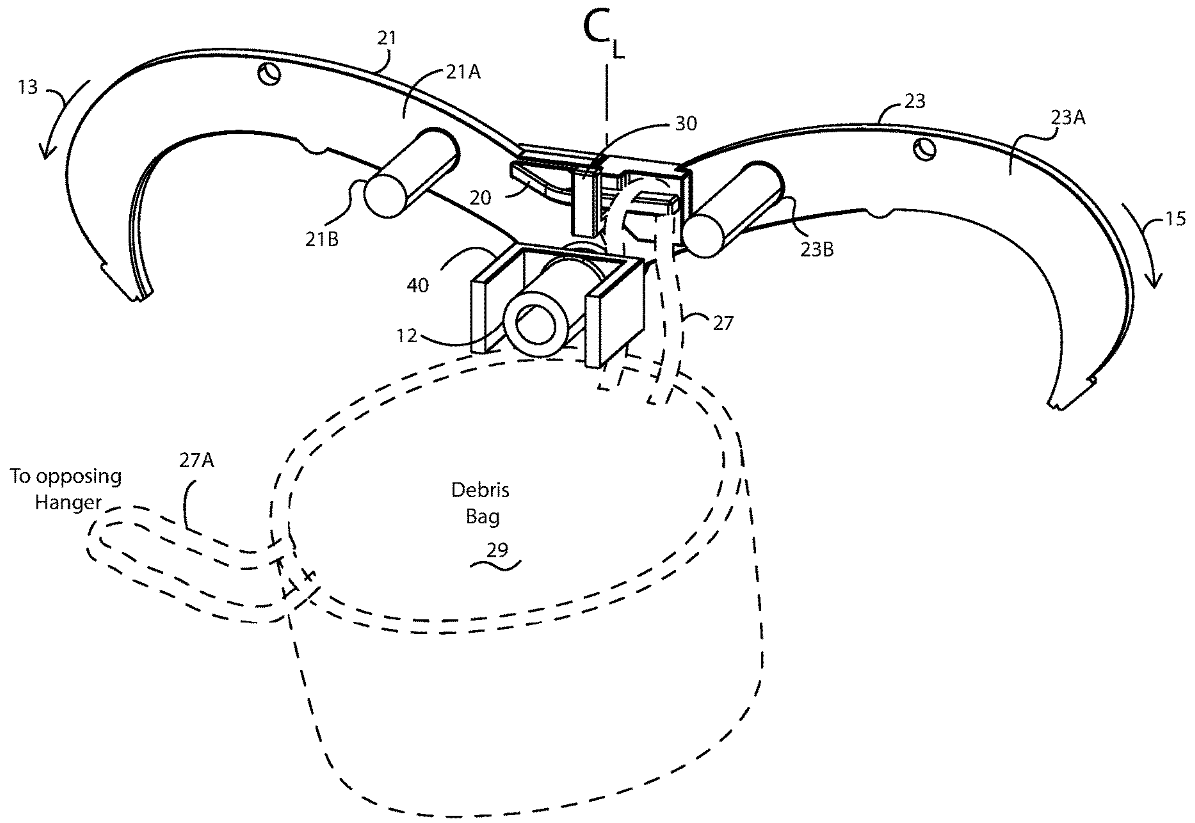
FIGS. 1-3 diagrammatically illustrate the hanger and wiper mounted on inboard sides of the left and right jaws, as viewed from a perspective looking from one axial end of the pivotal axle to the other end of the axle (other axle end is not shown in these Figures). As the viewer stands above, straddling the axle the left jaw would move counterclockwise and the right jaw would move clockwise during the open-close jaw operation. These Figures diagrammatically illustrate an upper perspective view along the longitudinal span of the pivotal grapple bucket axle. In a coordinated manner, the illustrated left and right jaws or jaw elements respectively move in a counterclockwise (left jaw) and a clockwise manner (right jaw) about the pivotal axle. The straps of the debris-carrying bag are shown in dashed lines in these Figures. These Figures are illustrative and do not show dimensional aspects of the invention but rather show relational aspects of the components, which relational aspects are more fully set forth below.

While the specification concludes with claims defining the features of the invention that are regarded as novel and inventive, it is believed that the invention will be better understood from a consideration of the following descriptions, when take in conjunction with the drawings, in which like reference numerals refer to identical or similar items. It is to be understood that these embodiments are merely exemplary of the invention, which can be embodied in various forms.

The present invention provides a novel and efficient grapple bucket with debris bag hanger and autonomous strap release. The Figures show several advantageous features of the present invention, but, as will be described below, the invention can be provided in several shapes, sizes, combinations of features and components, and varying numbers and functions of the components.

Figure 2:
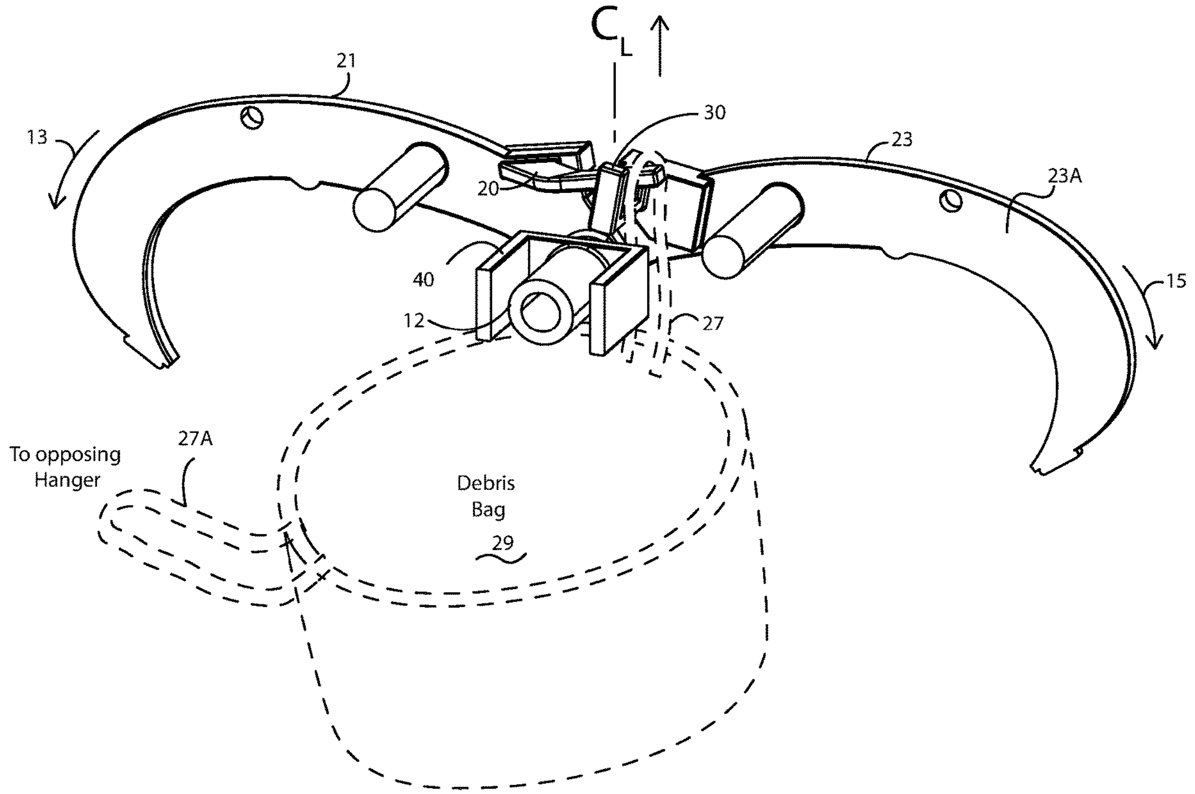
Figure 3:
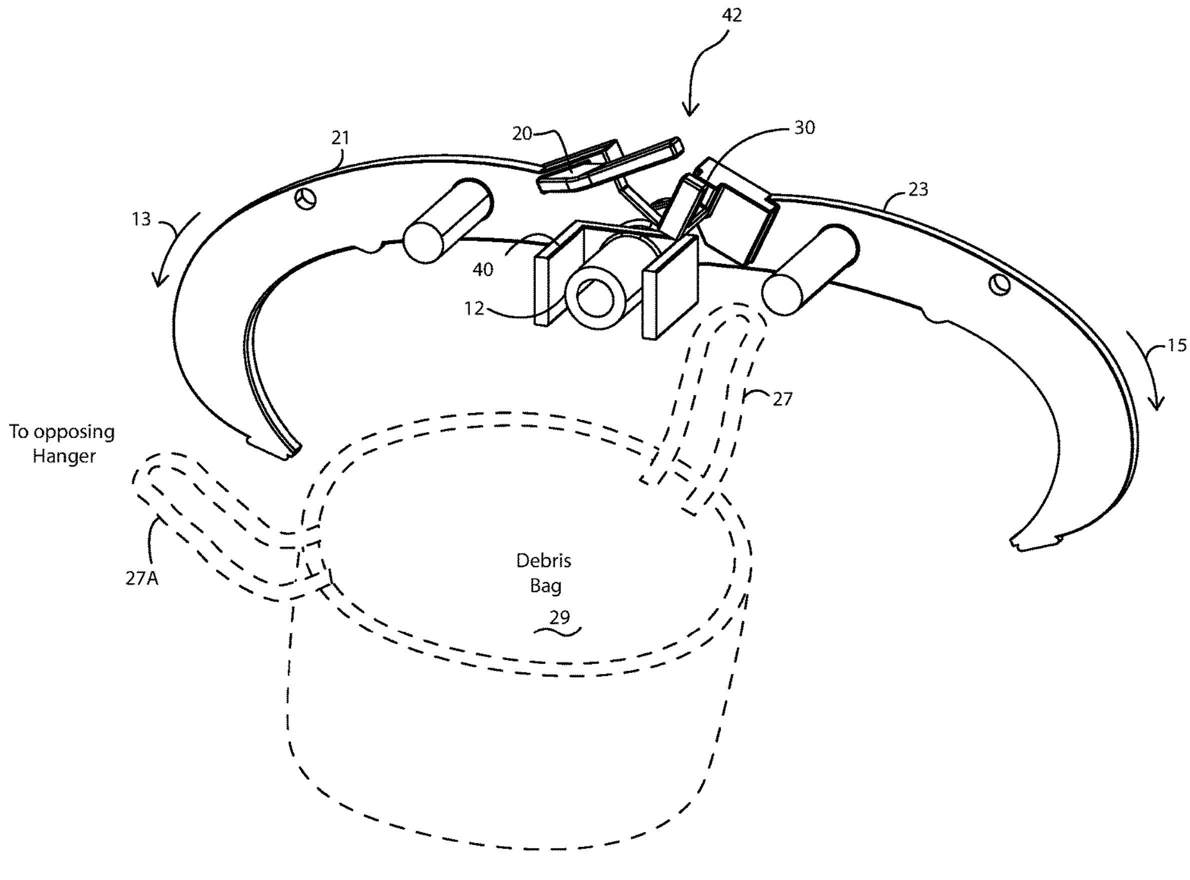

FIGS. 1-3, which are discussed concurrently herein, diagrammatically illustrate hanger 20 mounted on the first grapple jaw 21 and wiper 30 mounted on the second grapple jaw 23. In the present embodiment, hanger 20 and wiper 30 are mounted on the inboard sides 21A, 23A of the jaws. "Left" and "right" are viewed from a perspective of a person looking from one axial end of the pivotal axle 12 to the other end of the axle (which other axle end is not shown in these Figures). C-L in FIGS. 1-4B refers to a vertical plane defined by the centerline of the axle 12 wherein the upper portions of bucket jaws 21, 23 pivot away from the C-L plane such that in an open position (FIG. 1) the upper portions of the jaws are extremely close and, in the partly closed position (FIG. 3) the upper portions of the jaws are far apart. In a coordinated manner, the illustrated left and right jaws or jaw elements 21, 23 respectively move in a counterclockwise direction 13 and a clockwise direction 15 manner about pivotal axle 12. FIG. 1 shows jaws 21, 23 in a substantially open jaw position. The legend "C/L" refers to an imaginary centerline extending vertically through the center of pivotal axle 12 and the centerline establishes a plane running coexistent with elements rotating about the axle's centerline.

As used herein, the term "open jaw position" means that the two opposing jaw sets are mainly open and the phrase includes, but is not limited to, a fully open opposing jaw position. This phrase and similar phrases do not mean that the opposing jaw sets cannot open wider than illustrated herein. Rather, the open jaw position phrase mainly defines a wide span between the opposing jaw teeth. As used herein, the phrase "partly closed jaw position" and similar phrases mean that the opposing jaw sets are generally closed. However, the phrase includes, but is not limited to, both a partly closed jaw condition and a fully closed opposing jaw position. As explained later in this specification, the hanger's jaw-mount position, the strap hanger surface, and the shortened length of the strap hanger surface relative to the wiper jaw-mount position, the wiper surface, and transverse length of the wiper surface define a mechanical system which changes based upon the arcuate movement of the left and right jaw sets from the jaw set the open position and the jaw set closed position. Stated otherwise, the jaw sets must close further together (possibly fully closed) if a longer strap hanger surface is provided than the surface illustrated herein. Again, the mount position and the length of the strap hanger surface and the wiper-jaw mount position and the configuration of the wiper surface all play a part in when the hanger surface-wiper surface gap is formed resulting in the wiper pushing the strap off the hanger surface and causing the strap to fall though the gap.

Straps 27, 27A of the debris-carrying bag 29 are shown in dashed lines in FIGS. 1-3. In FIG. 1, straps are shown in opposing positions on debris-carrying bag 29. Strap 27 is placed over and about elongated hanger 20 and, more particularly, on a hanger-defined strap carrying region. Hanger 20 is mounted at one end to the inboard surface of jaw 21. At the other opposing end, hanger 20 has a terminal end corresponding to the end of the strap carrying hanger region. To provide some scale to the working embodiment, one type of debris bag 29 is approximately 4-5 feet in diameter and between 2-4 feet in depth. Also in the preferred embodiment, debris bag 29 includes two opposing lifting straps 27, 27A. However, the grapple jaw the debris bag lifting system may be utilized with a single strap extending from one peripheral region of the bag 29 to the other opposing peripheral region of the bag. As described later, the more efficient and safer construction uses a debris bag with two lifting straps, each strap to be placed on a separate hanger. One hanger on the left-axle side and a second hanger on the right-axle side.

As is known in the prior art, jaw 21 is controllably moved through its arcuate length in direction 13 by a motive force applied to rotatable coupling 21B. Similarly, another motive force changes the pivotal or arcuate position of jaw 23 in a counter-rotational direction 15 and is applied to pivotal coupling 23B of jaw 23. Jaws 21, 23 rotated about pivotal axle 12. Axle 12 or its complementary sleeve, is mounted in grapple bucket saddle 40. Further technical details of grapple buckets and operational aspects of jaws 21, 23 are discussed in the prior art identified earlier.

FIG. 2 diagrammatically illustrates that the grapple jaws 20, 23 have been partly rotated in directions 13, 15 about pivotal axle 12. The strap carrying region of hanger 12 continues to retain or support lifting strap 27. FIG. 3 diagrammatically illustrates grapple jaws 20, 23 in a partly closed jaw position. In that partly closed position, sometimes referred to as the mid-way closed jaw position, the terminal end of hanger 20 has been separated away from wiper 30 by gap 42. The gap is defined between the terminal exposed hanger end and the opposing surfaces of wiper 30. When the terminal end of hanger 20 is spaced apart from wiper 30 by gap 42, lifting strap 27 falls off strap carrying region of hanger 12 as shown in FIG. 3. At that point, debris carrying bag 29 falls off the grapple bucket jaws and is deposited at the desired location by the grapple truck operator. In one embodiment, the debris carrying bag 29 is deposited in an open top truck bed.

Figures 4A, 4B:
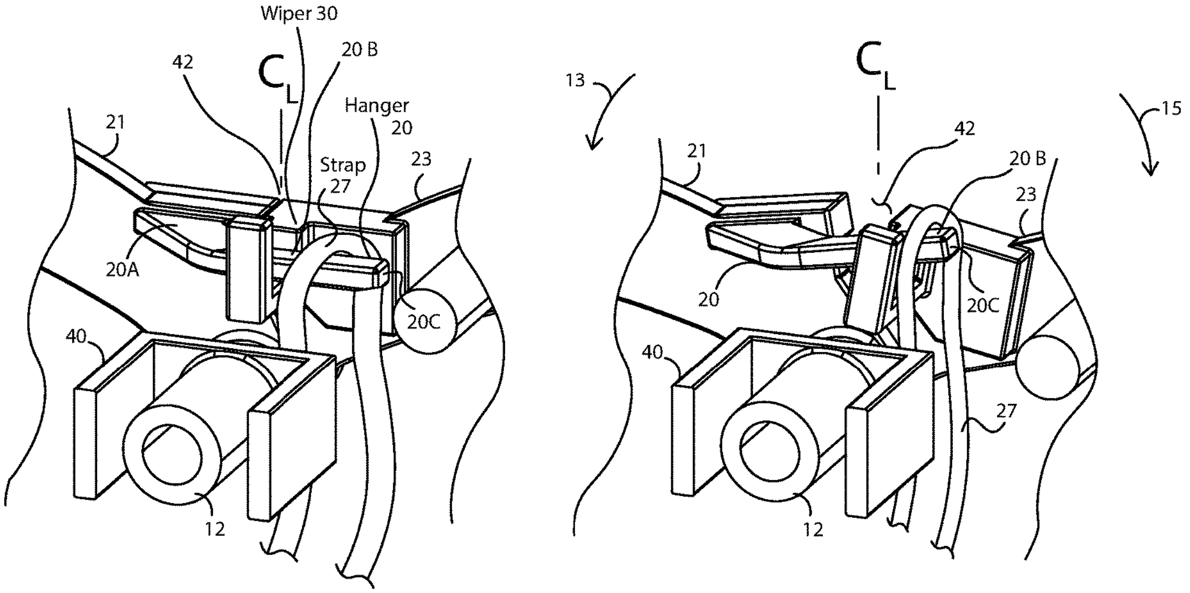
FIGS. 4A and 4B diagrammatically illustrate more detailed views of the hanger and wiper mounted on the inboard sides of the left and right jaws. The straps of the debris-carrying bag are shown in solid lines in these Figures. Similar to FIGS. 1-3, these Figures are illustrative and do not show dimensional aspects of the invention.

FIGS. 4A and 4B are discussed concurrently herein. FIGS. 4A and 4B diagrammatically illustrate a more detailed view of the hanger 20 and wiper 30 mounted on the inboard sides of the left and right jaws 21, 23. The lifting strap 27 of the debris-carrying bag is shown in solid lines in these Figures. In FIG. 4A, strap 27 rests atop strap carrying region 20B. As discussed earlier, the terminal end 20C of the strap carrying region is opposite mounted hanger end 20A. Mounted end 20A is attached to the inboard side of jaw 21. FIG. 4A generally illustrates the substantially open jaw position when there is a small gap 51 between the opposing vertical end walls of jaws 21, 23. In other words, FIG. 4A diagrammatically shows the condition of the system when strap 27 is that initially placed on the strap carrying region 20B of hanger 20.

In contrast, FIG. 4B diagrammatically shows the arcuate position of jaws 21, 23 just prior to the "partly closed jaw position," or the mid-way closed jaw position. In that nearly partly closed jaw position, strap 27 is adjacent terminal end 20C of hanger 20. The strap has been pushed to the terminal end by the wiper surface. Further pivotal movement in directions 13, 15 cause strap 27 to be pushed completely off hanger 20, fall through gap 42 (FIG. 3) and escape beyond terminal end 20C.

Figure 5:
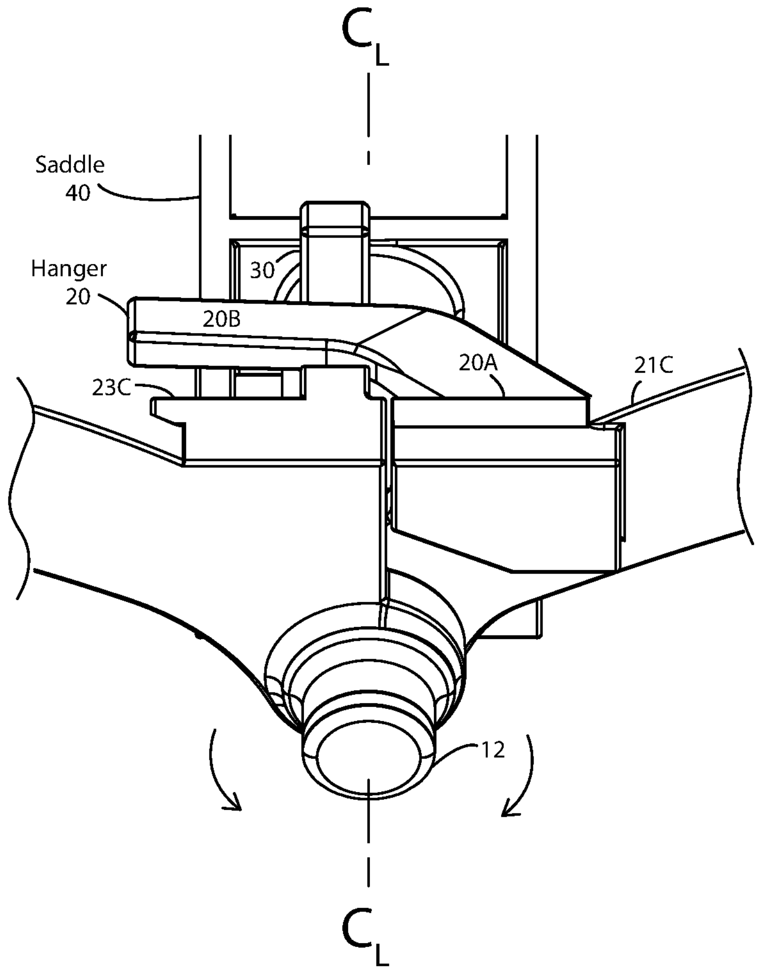

FIG. 5 diagrammatically illustrates the opposing jaw set 23C, 21C. FIG. 5 diagrammatically illustrates an upper axial view of the hanger 20 and wiper 30 looking down on the pivotal axle 12 and illustrates an inboard side of a transverse right-side jaw unit. FIG. 5 shows the inboard transverse right side of the grapple bucket whereas FIGS. 1-4B show the inboard portions of the transverse left side jaws. The terms "transverse left side" and "transverse right side" in these Figures are taken from the perspective of a viewer at a transverse axle position, that is, normal or perpendicular to pivotal axle 12, which extends to the transverse left and the transverse right of the viewer. In FIG. 5, hanger 20 is mounted on jaw 21C and wiper 30 is mounted on jaw 23C. Strap carrying hanger region 20B is shown in greater detail than FIGS. 1-3.

In operation in one embodiment, first, the grapple jaws are in the open jaw position and are positioned by the boom operator over the debris carrying bag. A ground worker then lifts the bag's lifting strap (not shown) over saddle 40 (FIG. 5) and over pivot axle 12 and places the strap on the strap carrying region 20B of the hanger 20. The ground worker then repeats the process with the opposing strap on the opposing hanger in the current embodiment. Boom operator then raises grapple by operation of the boom. The straps are held on the left jaw set 21,23 and on the right jaw set 21C, 23C. As a result, the debris carrying bag is lifted from the ground and this permits the boom operator to reposition the debris carrying bag to the desired debris deposit locational position. In one operational embodiment, the debris carrying bag is deposited into an open top truck bed by lowering the bag into the open top truck bed.

Preferable, the debris carrying bag has two opposing straps and the grapple bucket has a hanger-wiper set on the transverse leftmost jaw set and an opposing hanger-wiper set on the transverse rightmost jaw set. The ground worker then lifts the bag's transverse left lifting strap over the transverse left saddle region and over the transverse left pivot axle region and places the strap on the transverse left hanger strap carrying region. The ground worker then repeats the process with the transverse right strap on the transverse right hanger.

At the deposition site, the debris bag and its contents are released into the truck by the wiper 30 pushing the strap 27 off the strap carrying hanger surface 20B (FIG. 5) and through gap 42 (FIG. 3). With respect to FIGS. 1-5, it is believed that the conjoining lower U-element of the U-shaped wiper 30 pushes the strap off the hanger. See conjoining U-element 30B in FIG. 6B. Since the debris carrying bag is, in most instances, quite heavy, the pushing action of wiper 30 pushing the strap 27 off the strap carrying hanger surface 20B (FIG. 5) and through gap 42 (FIG. 3) is autonomous, that is, without human assistance. The autonomous operation of the strap off-load is one of several important aspects of the present invention.

Figure 6A:
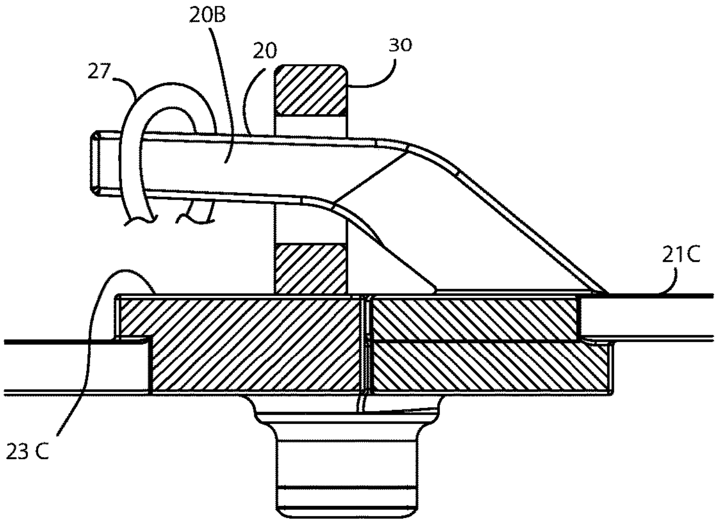
FIGS. 6A and 6B respectively diagrammatically illustrate a top plan view (FIG. 6A) and a cross-sectional view (FIG. 6B) of the hanger cooperating with a U-shaped wiper.
Figure 6B:
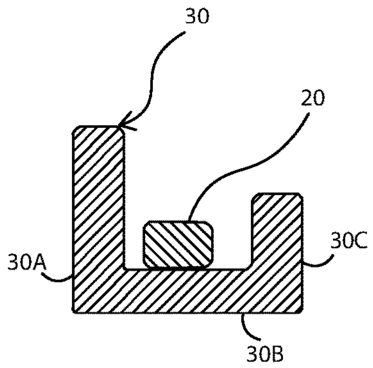

FIGS. 6A and 6B, discussed concurrently herein, respectively diagrammatically illustrate a top plan view (FIG. 6A)

and a cross-sectional view of the hanger 20 cooperating with a U-shaped wiper 30. FIGS. 5 and 6B show the hanger 20 substantially nesting in the U-shaped wiper 30. The term "nesting" is meant to include both in-contact with and closely adjacent to the two elements. FIG. 6B shows a cross-section of the U-shaped wiper consisting of an upwardly extending leg 30A, which, in the illustrated embodiment, extends above the horizontal strap carry surface 20B of hanger 20. See both FIG. 6B and FIG. 5. The shorter opposing U-leg 30C is mounted or attached to jaw 21C as shown in FIGS. 6A and 5. Conjoining element 30B joins vertically extending leg 30A and shorter, mounting leg 30C.

Figure 7:
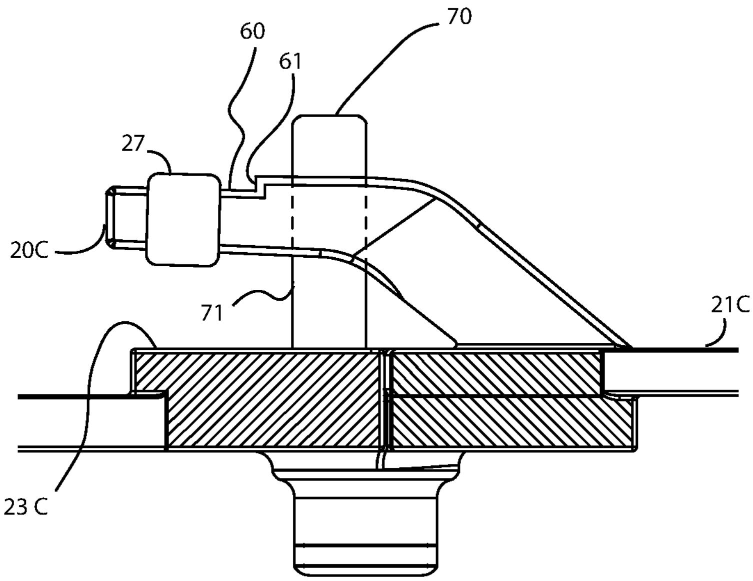
FIGS. 7-9 diagrammatically illustrate different embodiments of the hanger and the wiper.
Figure 8:
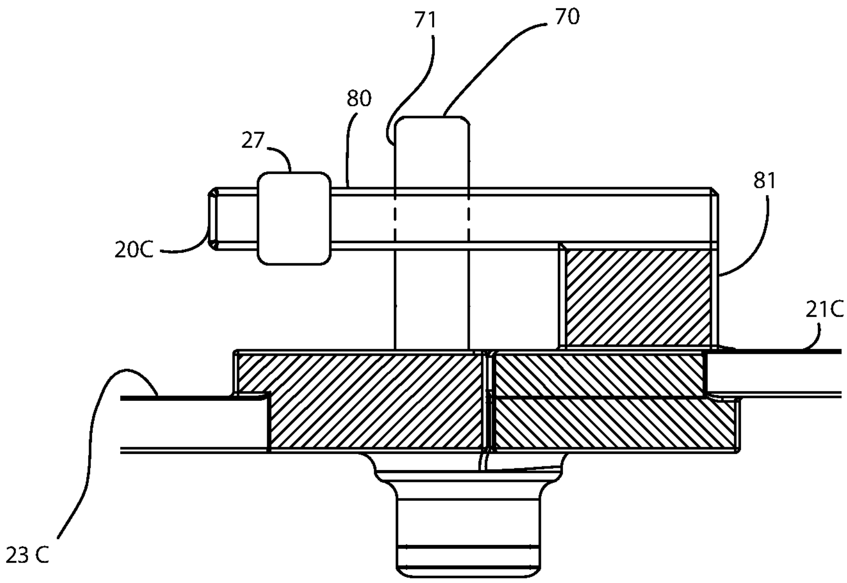
Figure 9:
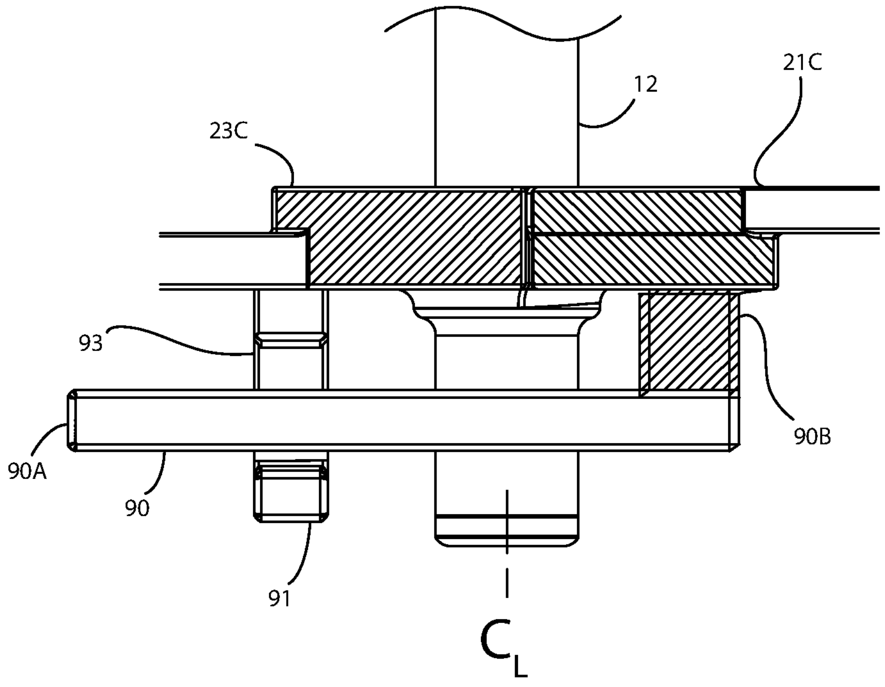

FIGS. 7-9 diagrammatically illustrate different embodiments of the hanger 20 and the wiper 30. In FIG. 7, hanger 70 retains lifting strap 27. Hanger 70 has lateral extending shoulder 61. Shoulder 61 limits further onboarding of strap 27. Shoulder 61 is a strap stop. In the illustrated embodiment, shoulder 61 extends axially inboard into the grapple jaw bucket. Wiper 70 is configured as a single inboard extending bar with a wiper surface 71. It is believed that when strap 27 is positioned on the strap carrying region of hanger 60, and jaw 21C pivotally rotates away from jaw 23C, the lower extending portions of strap 27 impact wiping surface 71 due to continuing rotational downward movement 15 (FIG. 1) of jaws 23C and 21C and will cause formation of gap 42, shown in FIG. 3, and the wiping surface 71 will push strap 27 from terminal hanger end 20C.

FIG. 8 is similar to FIG. 7 however hanger 80 is mounted to jaw 21C by a standoff member 81 and the hanger is generally bar-shaped with a substantially square cross-sectional shape throughout its elongated extending body length. In a similar manner, hanger 80, when rotated in direction 13, counter to hanger rotation 15, strap 27 will strike wiper surface 71 of wiper 70 in push strap 27 off terminal hanger end 20C.

FIG. 9 diagrammatically illustrates another embodiment of the present invention however the hanger-wiper system is disposed outboard of jaw sets 23C, 21C. In this embodiment, hanger 90 is offset the outboard jaw surface by mounting block 90B which securely mounts hanger 92 jaw of 21C. Wiper 91 has wiper surface 93 which pushes the strap off of the terminal end of hanger 90. Again, the counter rotation of jaw 23C compared with jaw 21C causes a gap to form between terminal end 90A and the wiper surface 93 thereby forcing strap (not shown) to be pushed off of hanger 90 through the gap.

Although reference is made herein and in the claims to the "partly closed jaw position," it is believed that one of the several critical operational points of the invention is established by the terminal end of the hanger passing by the opposing wiper surface forcing the strap, on the hanger's strap carrying region, to be pushed off the hanger and fall though gap 42 (FIG. 3). The elongated length of the hanger (that is, the foreshortened strap carrying region), the angular position of the hanger on the jaw (including the disposition of the strap carrying region) with respect to the pivotal axle, the mounting position of the hanger on its respective jaw, the location of the wiping surface on the wiper, the angular position of the wiper (and the wiper surface) with respect to the pivotal axle, the mounting position of the wiper on its respective jaw, and the arcuate length of the counter-rotating opposing left and right jaws, all effect the release location of the strap off the hanger and the opening of the hanger-wiper gap. Hence, the partly or fully closed jaw set position and the initial formation of gap 42 between the hanger terminal end and the wiper surface, is designed by an engineering analysis of the various mechanical elements discussed herein.

In a current embodiment, the jaws in the open jaw position are in a substantially horizontal mainly fully open position with respect to each other. Also in the current embodiment, the partly closed jaw position is more than halfway through the arcuate jaw swing. In the current embodiment, in the open jaw position, the hanger and strap carrying surface are substantially horizontal to the ground plane and the upper surface of the conjoining U-leg of the wiper is also horizontal. In this embodiment, the lower surface of the hanger rests on the conjoining U-leg. Stated otherwise, the inboard end of the hanger's strap carrying region is adjacent or in contact with the U-shaped wiper (a nested condition).

The grapple bucket with the debris bag hanger has an autonomous strap release because the strap is pushed off the hanger and falls through the gap caused by the closing of the left and right jaw sets. The release is automatic due to the engineered positions of the hanger and the wiper. No human intervention is needed to push the heavy bag strap off the hanger.

The following describes the operating procedures for one embodiment of the present invention. The grapple bucket jaws are fully open during steps 1-11. Step 1. Place bucket over the debris bag as close as the loaded bag allows. The hanger arms should be above and substantially adjacent the straps on the debris carrying bag. Step 2. When facing the side end bucket outboard of the pivot axle, with the bucket jaws on the left and the right, pick up the first strap and pull it up through the inside, inboard region of the bucket on the right side of the pivotal axle (sometimes called the pivot pin) and the saddle. See FIG. 5. Step 3. Place the strap between the saddle assembly and the jaw sides. Step 4. Bring the strap from the right side to the left side once it is above the bucket axis or pivot pin. Step 5. Place the strap over the hanger arm and the strap carrying region and push the strap transversely onto the hanger. Step 6. Pull down firmly on the strap below the pivotal axle or pivot pin to make sure it is secured in place on the hanger arm and in between the saddle and jaw sides. Step 7. For the second bag strap repeat steps 2-6.

Step 8. Once both straps are in place on the transverse left side of the bucket and the transverse right side of the bucket, the bag is ready for lifting. Return to the boom-grapple operator's station. Step 9. Lift the bag keeping the bucket fully open while it is in the air. Step 10. Lower the bag to its desired debris deposit location, letting a small amount of slack build on the straps. Step 11. Close the bucket slowly until the straps are pushed off the hanger arm via the wiper. Step 12. Visually verify both straps have been released before lifting the bucket.

The claims appended hereto are meant to cover modifications and changes within the scope and spirit of the present invention.

What is claimed is:

1. A grapple bucket with debris bag hanger, the grapple controllably movably coupled to a boom, and the grapple adapted to lift and move a debris bag having at least one lifting strap, the grapple comprising:

a first grapple jaw and a second grapple jaw pivotally mounted on a bucket axle, both jaws configured to controllably pivot on the axle from an open jaw position to a mid-way closed jaw position;

an elongated hanger having one end mounted on the first jaw above the axle and a strap carrying region at a terminal end opposite the one end, the hanger extending transversely over the axle in the open jaw position; and a wiper mounted to the second jaw and defining, in the open jaw position, a wiper surface adjacent the strap carrying region; and the strap carrying region and the terminal end foreshortened to arcuately bypass the wiper surface during a pivotal transition from the open jaw position to the mid-way closed jaw position, wherein the mid-way closed jaw position is coincidental with a gap formed between the terminal end and the wiper surface.

2. The grapple bucket as claimed in claim 1 wherein in the mid-way jaw position the gap is defined between the terminal end of the foreshortened strap carrying region and the wiper surface and the lifting strap is pushed off the foreshortened strap carrying region by the wiper surface through the gap.

3. The grapple bucket as claimed in claim 1 wherein, in the open jaw position, the strap carrying region is substantially horizontal and the wiper is at least one of a horizontal wiper member wherein the wiper surface extends transversely to the strap carrying region, and a U-shaped wiper with the conjoining U-element defining at least a portion of the wiper surface wherein in the open jaw position the strap carrying region nests into the U-shaped wiper.

4. The grapple bucket as claimed in claim 1 wherein the at least one lifting strap is a first lifting strap and the debris-carrying bag has a second lifting strap; and the elongated hanger is a first hanger having a first end mounted on the first jaw at a first jaw location above the axle;

a second elongated hanger having a second end mounted on either the first jaw or the second jaw at a second jaw location above the axle;

the first and second hangers respectively having first and second strap carrying regions at respective first and second terminal ends opposite the respective first and second ends, the first and second hangers respectively extending transversely over the axle in the open jaw position;

a first and a second wiper respectively mounted to an opposing jaw of the first and second jaws, the first and second wipers respectively defining first and second wiper surfaces adjacent respective first and second strap carrying regions in the open jaw position; and the first and second strap carrying regions foreshortened to respectively arcuately bypass the respective first and second wiper surfaces during a pivotal transition from the open jaw position to the mid-way jaw position.

* * * * *